United States Patent [19]

Troendle

[11] Patent Number: 4,721,860

[45] Date of Patent: Jan. 26, 1988

[54] LASER SCANNER FOR BAR CODE READER

[75] Inventor: Dale Troendle, Skaneateles, N.Y.

[73] Assignee: Skan-A-Matic Corp., Elbridge, N.Y.

[21] Appl. No.: 912,745

[22] Filed: Sep. 23, 1986

Related U.S. Application Data

[63] Continuation of Ser. No. 652,989, Sep. 20, 1984, abandoned.

[51] Int. Cl.$^4$ .............................................. G06K 7/10
[52] U.S. Cl. .................................... 250/568; 235/462
[58] Field of Search ............... 235/462, 463, 464, 465, 235/466, 467, 472; 350/420, 433; 250/568, 234, 216

[56] References Cited

U.S. PATENT DOCUMENTS 3,917,414  11/1975  Geis et al. ............................ 350/433
4,387,297   6/1983  Swartz et al. ........................ 235/467
4,408,120  10/1983  Hara et al. ........................... 235/462
4,496,209   1/1985  Itoh et al. ............................. 350/433

Primary Examiner—David C. Nelms
Assistant Examiner—Michael Messinger
Attorney, Agent, or Firm—John P. Murphy

[57] ABSTRACT

A laser scanner wherein an elliptical laser light beam is directed to the target (a bar code symbol) so as to increase the signal to noise ratio of the laser light received by the photodetector. The use of laser light in the shape of an ellipse, instead of the prior spherical shaped laser light, where the long axis of the elliptical laser light is aligned with the bars of the code being read reduces the distortion of the optical signals received by the photodetector. Thus the signal to noise ratio is maximized so as to enable the resolution of fine, dense bar codes.

12 Claims, 3 Drawing Figures

4,721,860

LASER SCANNER FOR BAR CODE READER

This is a continuation of prior complete application Ser. No. 652,989, filed on Sept. 20, 1984, now abandoned.

BACKGROUND OF THE INVENTION

1. Field of the Invention

The present invention generally relates to laser scanning systems and, more particularly, to laser scanning apparatus and methods of evaluating and validating bar code symbols such as Universal Product Code (UPC) symbols, and the many other types of symbols currently in use. More particularily the invention relates to a laser bar code reader having a focused elliptical field of view.

2. Description of the Invention

The grocery and food processing industries have developed a universal product code to uniquely designate each assigned product with a series of lines and spaces of varying widths, which pattern decodes to a multiple digit representation. Each such pattern is printed on the labels of even small items, and each line of the pattern must therefore be printed with a high degree of graphic precision.

The graphic arts industry has had considerable difficulty in printing the labels and packaging on a mass production basis due to the necessity of having to print the lines with the appropriate widths and against the appropiate background color. In view of the high production rates involved for grocery products, and other industrial products, poor quality control over the line widths and over the color contrast between the the line color and the background color results in a loss of considerable stock.

Other than the fixed scanning systems built into checkout counters of supermarkets, the prior art has proposed laser scanning heads moveable relative to, and electrically connected, with a console. However the known laser systems have not proven to be satisfactory. One of the reasons for the unsatisfactory results from the use of prior art scanning devices is that such laser scanning devices used a laser light source which was round in shape. The bar measurements taken by the scanning head were subject to a considerable amount of noise and modulation, thereby leading to inaccurate measurement evaluation and possible decoding errors. Finally, other ease of operation and evaluations criteria desired by the graphic arts industry have not been embodied in a laser scanning system.

SUMMARY OF THE INVENTION

Objects of the Invention

Accordingly, it is an object of the present invention to overcome the aforementioned drawbacks of the prior art.

Another object of the present invention is to provide an inexpensive, reliable, scanning head analyzer for a laser scanning system.

A further object of the invention is to provide an elliptical field of view that is less susceptible to defects than the round field of view in prior art laser scanning devices which caused inaccurate measurement evaluation and decoding errors.

Still an additional object of the present invention is to accurately measure bar widths, and feed such accurate readings to the photodetector, free of noise, which may be properly converted to amplified analog signals, and thence to digital signals compatible with decoding circuitry.

Features of the Invention

In keeping with the above objects, and others which will become apparent hereinafter, one feature of the invention is the directing of an elliptical laser light beam to the target (the bar code symbol), which lessens the noise and the resulting distorted readings of the bar code signals, which occured during the use of prior art laser scanning systems, wherein a round light beam was used. In a laser scanning system a laser beam and an optical assembly directs a light beam to a bar code symbol for reflection therefrom. A photodetector assembly detects the intensity of the light reflected from the symbol and generates an electrical signal indicative of the the intensity of the reflected light. By the use of a laser light beam on the target in the shape of an ellipse, instead of the spherical shaped light beam heretofore employed in laser scanners, with the long axis of the ellipse aligned with the bars of the code to be read the scanner is able to "see" a major portion of a bar, or space instead of only a small area which may contain printing errors. Thus the signal to noise ratio of the receiving system is greatly increased, and the distortion of the signals received by the photodetector is reduced, enabling the scanner to read fine, dense bar codes. Either a gas or solid state laser may be used. In the present invention the laser light is created by an electrical discharge through a cavity which may be filled with helium-neon, helium-cadmium, or argon gas. In a solid state laser power supply the electrical discharge passes through a cleaved gallium arsenide crystal. The electricity excites the atoms to higher than normal energy states. As the atoms fall to lower energy states, they emit light spontaneously at a wavelength corresponding to the change in energy.

DETAILED DESCRIPTION OF THE PREFERRED EMBODIMENTS

Figure 1:
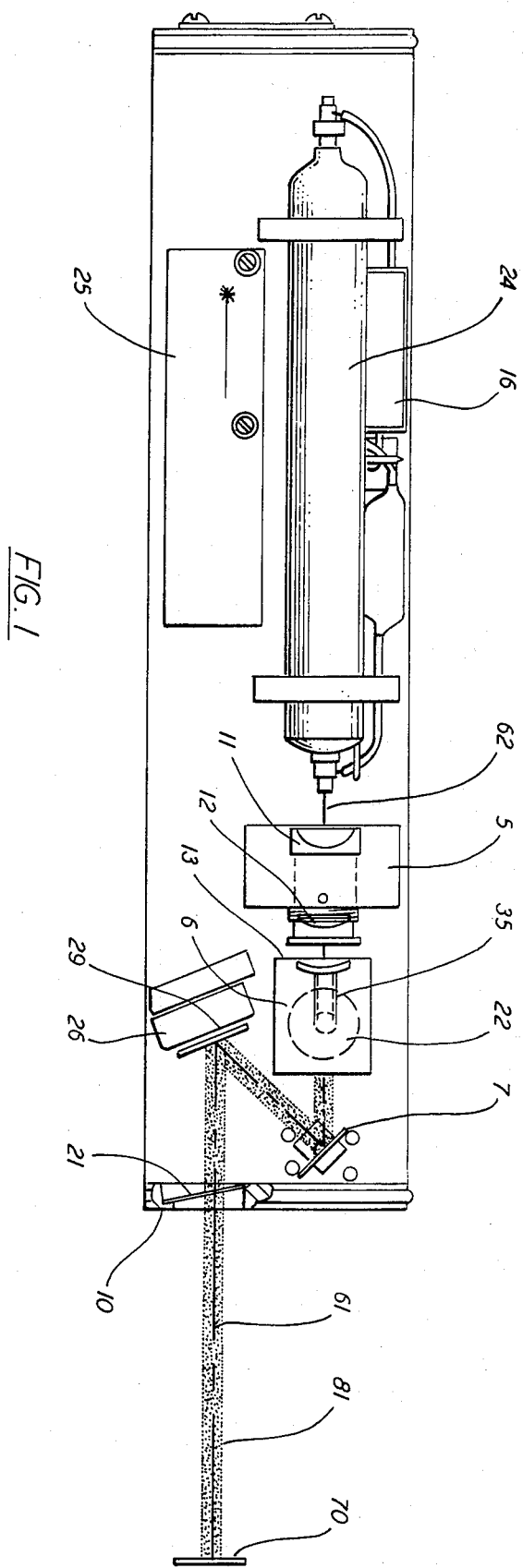
FIG. 1 is a side elevation, part-schematic view, with parts broken away of the laser based scanner.

Referring now to FIG. 1 of the drawings, reference numeral 10 generally identifies a laser scanning system device for use in a laser scanning system operative for reading and/or analyzing bar code symbols. Such symbols comprise a series of lines and spaces of varying widths, which pattern decodes to a multiple digit representation characteristic of the object bearing the symbol. Typical symbol bar codes in current use are the Universal Product Code (UPC), EAN, Codabar, Code 39 and Code 2 of 5.

Figure 3:
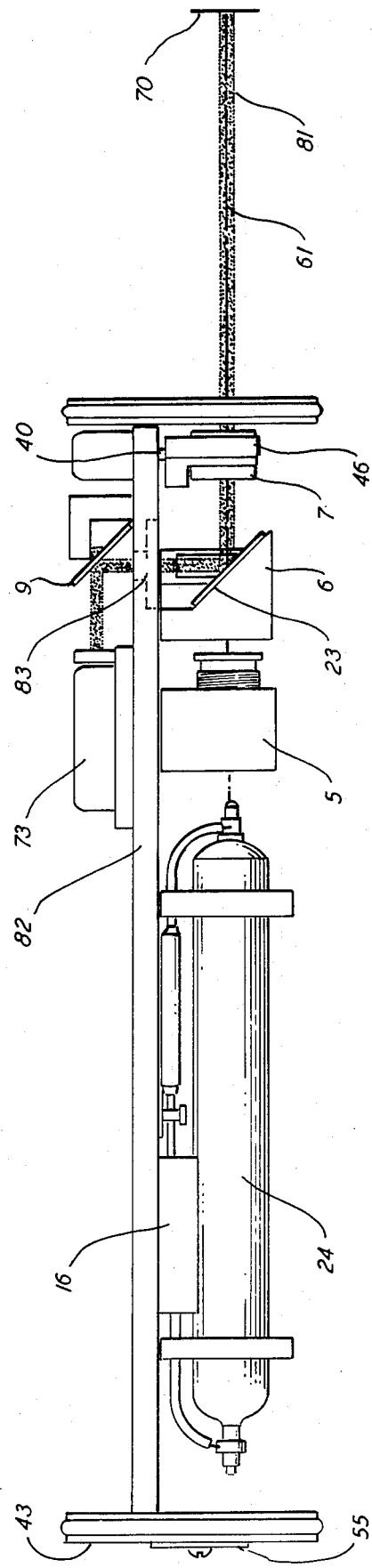
FIG. 3 is a top schematic view of the scanner with parts broken away.

Turning again to FIG. 1, either a 115 volt, or a 230 volt line enters the scanner 10 through a connector 55 on the rear panel 43 as shown on FIGS. 1 AND 3. From the connector 55 line-voltage is transferred to the laser power supply 25 where high frequency, and high voltage power is created to operate the Helium-Neon laser tube 24. The high voltage is transferred through a ballast resistor 16, which is conventional in this art, to the Helium-Neon gas laser tube 24. The stimulation of the high voltage excites the atoms of the gas mixture to a higher than normal energy state in the laser tube 24 creating an interaction of the atoms which results in the emission of a highly coherent light beam 62, from the front end of laser tube 24, at a wavelength corresponding to the change in energy.

Figure 2:
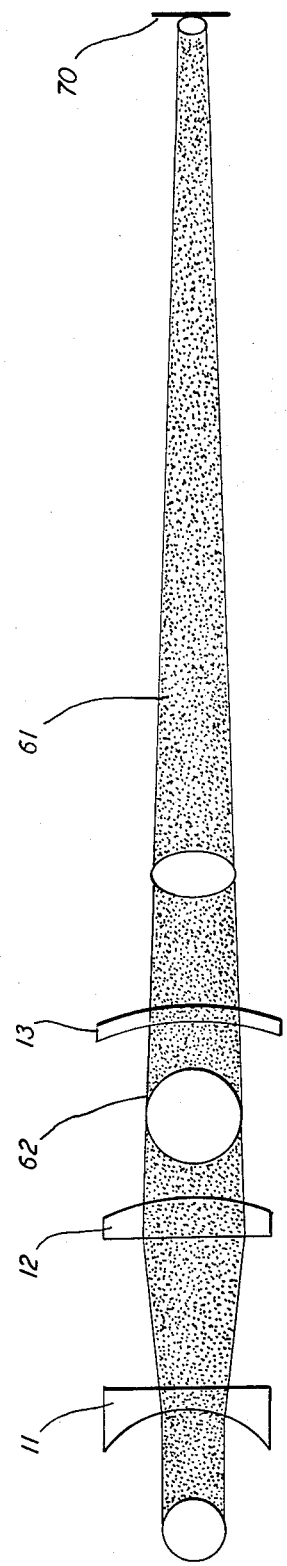
FIG. 2 is a diagram schematically illustrating the optical system of the scanner for transmitting the laser light to the focal plane, and for converting the transmitted light from a round or spherical shape to the elliptical shape which reaches the focal plane for reading the bar code.

The laser beam incident on the beam expander assembly 5 is diverged by the plano concave, negative lens 11 and then focused by the positive, plano convex lens 12 as shown in FIGS. 1, and 2. The spacing between lens 11 and 12 determines both the size of the focal plane 70, and the focal distance.

The highly coherent light beam 62 enters the mirror holder block assembly 6 where cylinder lens 13 is mounted. Lens 13, of FIGS. 1 and 2 is a cylinder lens having power only in one axis. The result is the creation of an elliptical laser light beam 61 which travels to the focal plane 70 in the shape of an ellipse, as shown in FIGS. 1 and 2.

The laser beam 61 leaves the the mirror holder block assembly 6 through an aperture 35 in the mirror holder block assembly 6. The elliptical shaped laser beam 61 then intersects the y axis of the cold mirror 7, which is held in place by bracket 46 of FIG. 3 The cold mirror 7 is mounted on a galvonmeter shaft 40 of FIG. 3 and can be rotationally oscillated to sweep the elliptical shaped laser beam 61 at angles up to +/− three degrees.

The elliptical shaped laser beam 61 reflects off the cold mirror 7 to intersect the x axis optical scanner 26 as shown in FIGS. 1 and 3. The x axis optical scanner 26 sweeps the reflected elliptical shaped laser light beam 61 through a total angle of thirty degrees. The elliptical shaped laser beam 61 reflects off the x axis optical scanner 26 and is transmitted through the cover glass 21 to intersect the focal plane 70, or bar code sample, some distance from the cold mirror 7. It is important to note that the shape of laser light beam 61 that reaches focal plane 70 is elliptical, as shown by elliptical light beam 61, on FIG. 2. A portion of the laser light 61 is reflected off the focal plane, or code sample 70, and is collected by the mirror 29 on the optical scanner 26. The intensity of the reflected light is determined by the reflectivity of the bar code, or target 70; white bars are more reflective than black bars.

The return laser light 81, is coaxial to the transmitted elliptical shaped laser beam 61. Laser light 81 returns on the same optical path as elliptical shaped laser light 61, until fold mirror, or sensor mirror 23 of FIG. 3 is intersected. At this point the return path 81 is reflected perpendicular to the transmitted light path 61 by mirror 23 of FIG. 3. The collector lens 22 of FIG. 1 images the return path through a lens stop, or aperture 83 in the main mounting plate 82 of FIG. 3. Also, as shown on FIG. 3 the imaged beam 81 is reflected off a fold mirror 9 onto photosensor, or photodiode 73.

The optical signals received by the focal plane 70, are in the shape of an ellipse. This is very important to the proper optical resolution of the bar code. Fields of view that are too large do not properly resolve narrow bars and spaces. Fields of view that are too small will resolve blemishes in the bar code. In such cases, may contain errors and may be misinterpreted by the decoder. The shape of the field of view can greatly influence a sensor's ability to resolve bar code. A small round field, such as has been used on the past is particularly suspectible to blemishes, and incorrect signals on the photodetector. However, the elliptical field of view of the present invention is much less susceptible to defects than a round field of view of the same width. Thus, the signals received by the photodetector, or sensor 73 increases the signal to noise ratio of the receiving system so as to read fine, dense, bar code.

The output of the photodetector is an electrical signal which is preamplified. A bar code signal digitizer translates the signal from the preamplifer into a variable width pulse train corresponding to the bar code which is being scanned. This pulse train may be translated to a requisite level for use in digital logic for decoding the bar code. Such decoding logic is conventional and is therefore not described in detail herein. The preamplifier and bar code signal digitizer may be part of the computer system with which the scanner is used.

While the invention has been illustrated and described as embodied in a particular scanner, it is not intended to be limited to the details shown, since various modifications and changes may be made without in any way departing from the scope of the invention.

I claim:

1. Scanning apparatus for reading bar code comprising a source of laser light, a series of optical lenses for converting the laser light into the shape of an ellipse as the laser light is directed to a bar code, a photodetector, and a laser light receiving system, whereby the signal to noise ratio of the light received by the photodetector is maximized, and distortions caused by printing errors in the focal plane are reduced.

2. Scanning apparatus according to claim 1 wherein said optical lenses include a plano convex, and a cylinder lens for converting the laser light into the shape of an ellipse as the laser light is directed to the bar code.

3. Scanning apparatus according to claim 1, wherein the source of the laser light is a laser tube.

4. Scanning apparatus according to claim 1 wherein the source of the laser light is a helium neon laser tube.

5. Scanning apparatus according to claim 1 wherein the source of the laser light is a helium cadmium laser tube.

6. Scanning apparatus according to claim 1 wherein the source of the laser light is a argon laser tube.

7. Scanning apparatus according to claim 1 wherein the laser light in the shape of an ellipse is aligned with the long axis of the bars of the bar code.

8. Scanning apparatus according to claim 2 wherein the laser light in the shape of an ellipse is aligned with the long axis of the bars of the bar code.

9. Scanning apparatus according to claim 3 wherein the laser light in the shape of an ellipse is aligned with the long axis of the bars of the bar code.

10. Scanning apparatus according to claim 1 including a beam expander.

11. Scanning apparatus according to claim 3 including a beam expander.

12. Scanning apparatus according to claim 8 including a beam expander.

* * * * *